United States Patent
Hall (10) Patent No.: US 9,829,651 B2
(45) Date of Patent: Nov. 28, 2017

(54) SYSTEMS AND METHODS FOR OPTICALLY CONNECTING FIBER ARRAYS WITH PAIRED TRANSMIT AND RECEIVE FIBERS

(71) Applicant: CORNING OPTICAL COMMUNICATIONS LLC, Hickory, NC (US)

(72) Inventor: Donald Kennedy Hall, Mooresville, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/707,916

(22) Filed: May 8, 2015

(65) Prior Publication Data

US 2015/0331192 A1   Nov. 19, 2015

Related U.S. Application Data

(60) Provisional application No. 61/994,446, filed on May 16, 2014.

(51) Int. Cl.
  *G02B 6/28* (2006.01)
  *G02B 6/38* (2006.01)
  (Continued)

(52) U.S. Cl.
  CPC ......... *G02B 6/3885* (2013.01); *G02B 6/2804* (2013.01); *G02B 6/40* (2013.01);
  (Continued)

(58) Field of Classification Search
  CPC . H04J 14/02; G02B 6/12007; G02B 6/29395; G02B 6/2938; G02B 6/28; G02B 6/36
  See application file for complete search history.

(56) References Cited

U.S. PATENT DOCUMENTS 6,758,600 B2   7/2004   Del Grosso et al. ........... 385/71
6,869,227 B2   3/2005   Del Grosso et al. ........... 385/71
(Continued)

FOREIGN PATENT DOCUMENTS

| DE | 102012020589 A1 | 4/2014 |
| DE | 102012020590 A1 | 4/2014 |
| WO | WO2014/063901 A1 | 5/2014 |

OTHER PUBLICATIONS

Corning Cable Systems, Plug & Play Systems with Multi-Fiber Connectors: Polarity Explained, AEN, Revision 9, Engineering Services Department, Revised May 5, 2010, 7 pages.
(Continued)

*Primary Examiner* — Jennifer Doan
(74) *Attorney, Agent, or Firm* — Brad C. Rametta (57) ABSTRACT

Systems and methods for optically connecting first and second fiber arrays at different locations with paired transmit and received fibers are disclosed. A method includes establishing at a first location first and second fiber arrays of fibers T and R, and establishing at a second location third and fourth fiber arrays of fibers T' and R'. A trunk cable is then used to optically connect fibers T to fibers R' and fibers R' to fibers T to form first fiber pairs (T,R) where T=1 to (N/2) and R=[(N/2)+1] to N, and second fiber pairs (T', R'), where T'=1' to (N/2)' and R'=[(N/2)+1]' to N', wherein N is an even number greater than 2.

7 Claims, 11 Drawing Sheets

(51) Int. Cl.
  *G02B 6/40* (2006.01)
  *G02B 6/46* (2006.01)
  G02B 6/44 (2006.01)

(52) U.S. Cl.
  CPC .............. *G02B 6/46* (2013.01); *G02B 6/3897* (2013.01); *G02B 6/4452* (2013.01); *G02B 6/4471* (2013.01)

(56) References Cited

U.S. PATENT DOCUMENTS

| | | | |
|---|---|---|---|
| 7,147,383 B2 | 12/2006 | Sullivan | 385/59 |
| 7,237,966 B2 | 7/2007 | Quinby et al. | 385/78 |
| 8,251,591 B2 | 8/2012 | Barnes et al. | 385/59 |
| 8,873,967 B2 | 10/2014 | Barnes et al. | 398/141 |
| 2005/0207709 A1 | 9/2005 | Del Grosso et al. | 385/71 |
| 2010/0098428 A1 | 4/2010 | Barnes et al. | 398/140 |
| 2013/0039626 A1 | 2/2013 | Bickham et al. | 385/124 |
| 2016/0041065 A1* | 2/2016 | L'Heureux | G01M 11/3136 356/73.1 |

OTHER PUBLICATIONS

Ryf, et al., "Mode-multiplexed transmission over conventional graded-index multimode fibers," Jan. 12, 2015, vol. 23, Optics Express 235, 12 pages.

Zollinger, R., HD MPO System, Convincing Cabling Solutions, Dec. 2013, 30 pages.

John D Downie, Jason E. Hurley, Dmitri V Kuksenkov, Christopher M. Lynn, Andrey E Korolev, Vladimir N Nazarov, "Transmission of 112 Gb/s PM-QPSK signals over up to 635 km of multimode optical fiber", Optics Express, vol. 19 Issue 26, pp. B363-B369 (2011).

Cisco 40 GBASE QSFP Modules Data sheet http://www.cisco.com/c/en/us/products/collateral/switches/nexus-9000-series-switches/datasheet-e78-730160.html.

* cited by examiner

SYSTEMS AND METHODS FOR OPTICALLY CONNECTING FIBER ARRAYS WITH PAIRED TRANSMIT AND RECEIVE FIBERS

PRIORITY APPLICATION

This application claims the benefit of priority under 35 U.S.C. §119 of U.S. Provisional Application Ser. No. 61/994,446 filed on May 16, 2014, the content of which is relied upon and incorporated herein by reference in its entirety.

FIELD

The present disclosure relates to optical fiber cabling systems, and in particular relates to pre-terminated modular cabling components and methods of optically connecting fiber arrays at two different locations with paired transmit and receive fibers.

The entire disclosure of any publication or patent document mentioned herein is incorporated by reference, including U.S. Pat. Nos. 6,758,600 and 7,689,079.

BACKGROUND

Pre-terminated optical fiber cabling, systems are used to dramatically streamline the process of deploying an optical networking infrastructure in the premises environment, particularly in data center applications. Such systems significantly reduce installation time and cost. Pre-terminated modular components of the system are simple to configure and can be installed, connected and operational in a fraction of the time when compared to using conventional, field-terminated methods. Commonly used pre-terminated modular components include jumper cables ("jumpers"), trunk cables, breakout modules, and breakout harnesses.

One important aspect of designing, manufacturing and deploying components in a pre-terminated and modular optical cabling system (or network) is ensuring that the duplexed transmitters and receivers connection locations on one end of the optical path defined by the system are in optical communication with select receive and transmit connection locations at the opposite end of the optical path. Management of how the transmit and receive connections locations are interconnected is commonly known as "polarity management."

Most modular optical cabling systems in commercial use are based upon cable assemblies having 12-fiber MPO-style connectors. In particular, these systems utilize trunk cables having fiber counts in multiples of 12 and that are furcated into one or more 12-fiber legs, with each leg terminated with a 12-fiber MPO-style connector. These trunk cables are placed into cable pathways to span the distance between various equipment locations, patching locations (cross-connects and interconnects) and other network access points.

To establish connectivity with duplex transceiver ports commonly used on active equipment, these trunk cables must be transitioned to duplexed single-fiber connectors or 2-fiber connectors. This is accomplished by mating the trunk's 12-fiber MPO connectors to breakout harnesses or breakout modules having 12-fiber MPO connectors on one end and either (a) 2-fiber connectors such as MT-RJ® connectors, or more commonly (b) duplexed single fiber connectors such as SC or LC connectors that are duplexed together with a duplexing adapters, clips or boots. These breakout assemblies are therefore sometimes collectively referred to as "transition assemblies" or "fan-out assemblies."

Bandwidth performance of some conventional optical fibers can be extended beyond their original performance specifications by concatenating them with engineered lengths of special optical fibers at optimal proximity to either the transmit or receive end of an optical link. Although these special fibers could be incorporated into the jumpers, there are practical considerations that make it more attractive to incorporate the special fibers into a breakout assembly, thereby extending the conventional functionality of a breakout assembly beyond that of merely transitioning from MPO connectors to duplex or 2-fiber connectors. Since a breakout assembly conventionally comprises duplexed fiber pairs terminated at one end into the same MPO connector, this means that the breakout assembly would need to comprise two different optical fibers or perhaps fibers of significantly different lengths. While it is possible to manufacture and test breakout assemblies with differing optical fibers and lengths, these requirements introduce complexities in manufacturing and testing that are undesirable and which conventional designs of breakout assemblies never anticipated.

Consequently, there is a need for a new type of breakout assembly and methods of concatenating such assemblies to form optical pathways that are capable of extending the performance of existing and future fiber installations while properly manage the polarity requirements of the cabling system while exploiting the benefits associated with factory pre-terminated modular components. Furthermore, it is desirable that these breakout assemblies be easy to manufacture and test when they contain more than one type or length of fiber.

SUMMARY

An aspect of the disclosure is a method of optically connecting first fiber pairs at a first location to second fiber pairs at a second location to form an optical path between the first and second locations. The method includes: establishing at the first location first and second fiber arrays comprising fibers T and R, respectively; establishing at the second location third and fourth fiber arrays comprising fibers T' and R', respectively; and optically connecting fibers T to fibers R' and fibers R to fibers T' so that first fiber pairs are defined by (T,R), where T=1 to (N/2) and R=[(N/2)+1] to N, and second fiber pairs are defined by (T', R'), where T'=1' to (N/2)' and R'=[(N/2)+1]' to N', wherein N is an even number greater than 2.

Another aspect of the disclosure is a method of optically connecting first fiber pairs at a first location to second fiber pairs at a second location to form an optical path between the first and second locations. The method includes: defining a first fiber array comprising fibers T=1 to N/2, a second fiber array comprising fibers R=[(N/2)+1] to N, a third fiber array comprising fibers T'=1' to (N/2)', and a fourth fiber array comprising fibers R'=[(N/2)+1]' to N', where N is an even number greater than 2; using at least one trunk cable, optically connecting the first fiber array to the fourth fiber array and optically connecting the second fiber array to the third fiber array to establish optical communication between the fibers in the respective fiber arrays as follows:

{T}→{R'}={1 to (N/2)}→{[(N/2)+1]' to N'};

{R}→{T'}={[(N/2)+1] to N}→{1' to [(N/2)]'};

and wherein the first fiber pairs are defined by (T,R), and the second fiber pairs are defined by (T', R').

Another aspect of the disclosure is an optical assembly in the form of a module for providing N optical connections for N/2 pairs of fibers, for N even and greater than 2. The module includes: a housing having at least one wall that defines an interior; at least one multifiber connector adapter penetrating the at least one wall; at least one of duplexed single-fiber connector adapters or 2-fiber connector adapters penetrating the least one wall; a first fiber array of fibers T=1 to N/2 terminated at one end by at least one multifiber connector inserted into the at least one multifiber connector adapter and terminated at the other end by either first single-fiber or first 2-fiber connectors inserted into the single-fiber or the 2-fiber connector adapters; a second fiber array of fibers R=[(N/2)+1] to N terminated at one end by the at least one multifiber connector inserted into the at least one multifiber connector adapter and terminated at the other end by either second single-fiber or second 2-fiber connectors inserted into the single-fiber or the 2-fiber connector adapters; and wherein the fibers T and R are paired as (T,R).

Another aspect of the disclosure is an optical assembly in the form of a harness for providing N optical connections for N/2 pairs of fibers, for N even and greater than 2. The harness includes: a first fiber array of fibers T=1 to N/2 terminated at one end by at least one multifiber connector and terminated at the other end by either first single-fiber or first 2-fiber connectors; a second fiber array of fibers R=[(N/2)+1] to N terminated at one end by the at least one multifiber connector and terminated at the other end by either second single-fiber or second 2-fiber connectors; and wherein the fibers T and R are paired as (T,R).

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Designations of "left" and "right" and "front" and "back" are used in some of the Figures for the sake of reference and to facilitate explanation and understanding and are not intended to be limiting as to position, direction, orientation, etc.

The discussion below and the claims refer to optical fibers, and in particular to different optical fibers. Optical fibers in the present disclosure may be differentiated by differences in attributes such as refractive index profile, core size, mode field diameter, cladding diameter, composition, or length. Optical fibers in the present disclosure may also be differentiated according to performance characteristics such bandwidth-distance product, skew, differential modal delay, attenuation performance, bend sensitivity, modal dispersion, chromatic dispersion, polarization mode dispersion, cutoff wavelength, or transmission modes supported under given operating conditions.

Optical Fiber Cabling System

Figure 1:
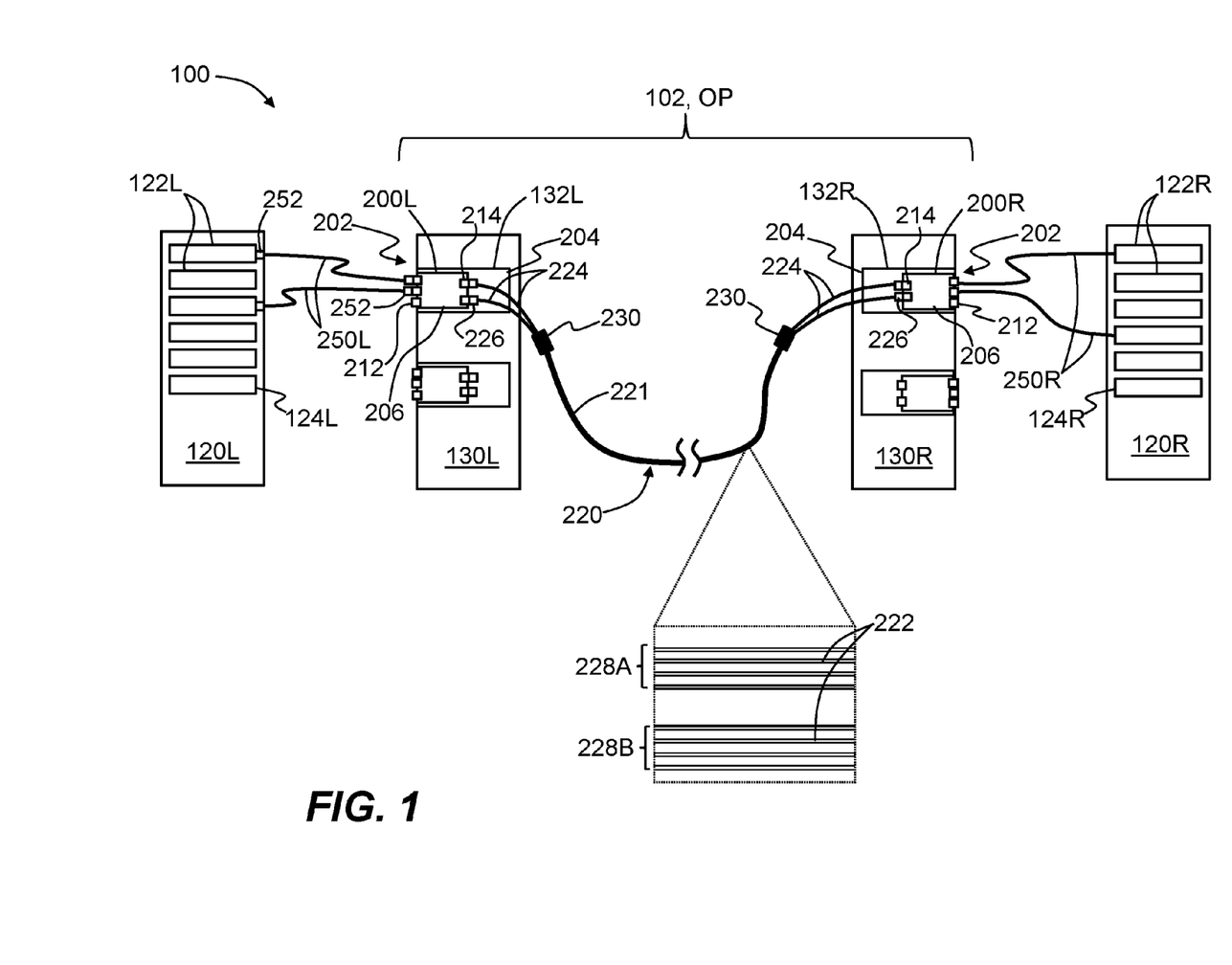
FIG. 1 is a schematic diagram of an example pre-terminated optical fiber cabling system that includes an example of a pre-terminated optical pathway as disclosed herein that utilizes a trunk cable and breakout modules.

FIG. 1 is a schematic diagram of an example pre-terminated optical fiber cabling system ("system") 100. System 100 includes a first and second (left and right) device equipment racks 120 (denoted 120L and 120R) that respectively support at least one electronic device 122 (denoted 122L and 122R), such as switches, routers, servers or data storage devices having optical transceivers (not shown). The transceivers typically have duplex optical communications connection locations (also referred to as "ports" in some embodiments) to accommodate transmit and receive signals. Each electronic device 122 has a front end 124.

System 100 also includes first and second (left and right) housing racks 130 (denoted 130L and 130R). Housing racks 130L and 130R each supports one or more housings 132 (132L and 132R, respectively), wherein each houses one or more breakout modules 200 (200L and 200R, respectively). In an example, breakout modules 200L and 200R have the same configuration, i.e., are identical modules.

Figure 2A:
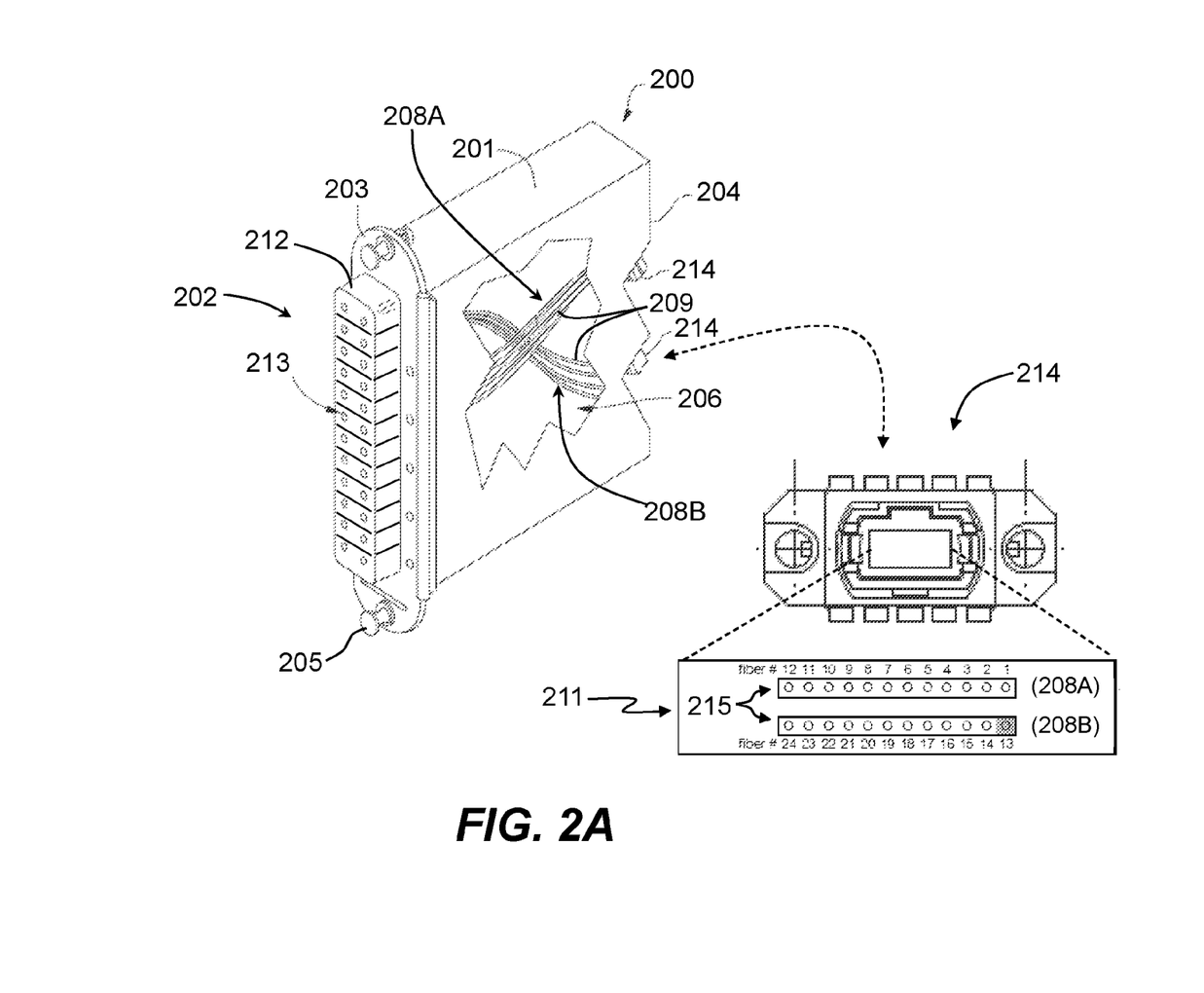
FIG. 2A is an front elevated and partial cut-away view of an example breakout module according to the disclosure, that shows some of the fibers of the first fiber array and some of the fibers of the second fiber array, and that shows a close-up end-on view of an example of a back-end connector adapter and corresponding connector with example connection locations.
Figure 2B:
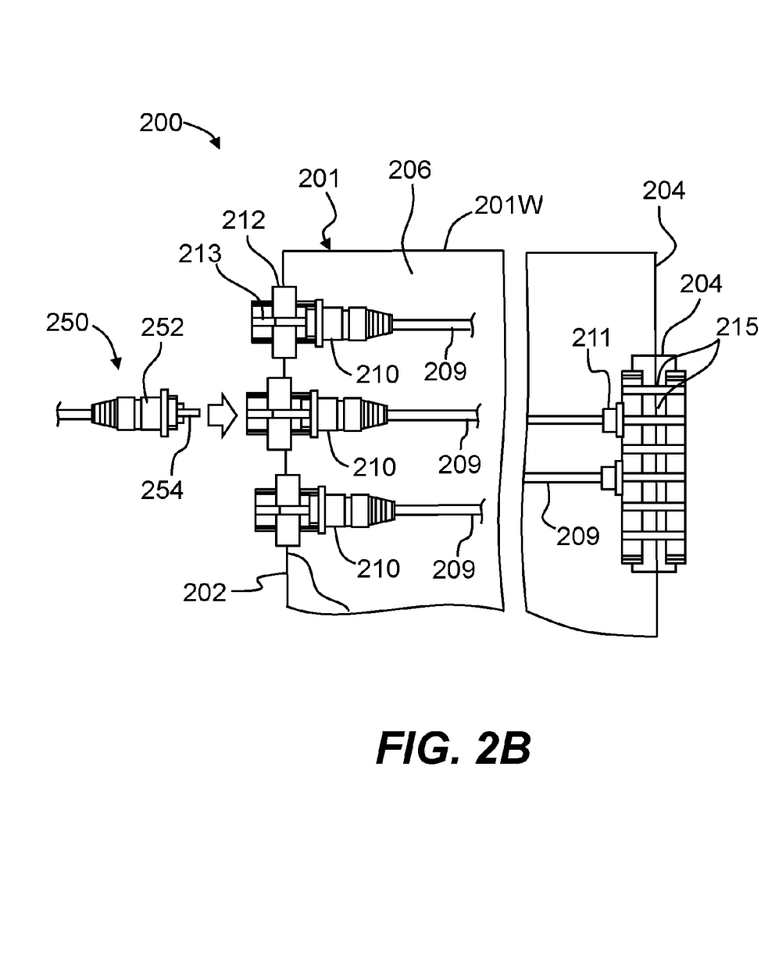
FIG. 2B is a close-up side and partial cut-away view of an example breakout module that shows the front-end adapters and a back-end adapter, corresponding front-end and back-end connectors, along with the internal fibers of the fiber array, and an end portion of a jumper cable showing the jumper cable connector.
Figure 2C:
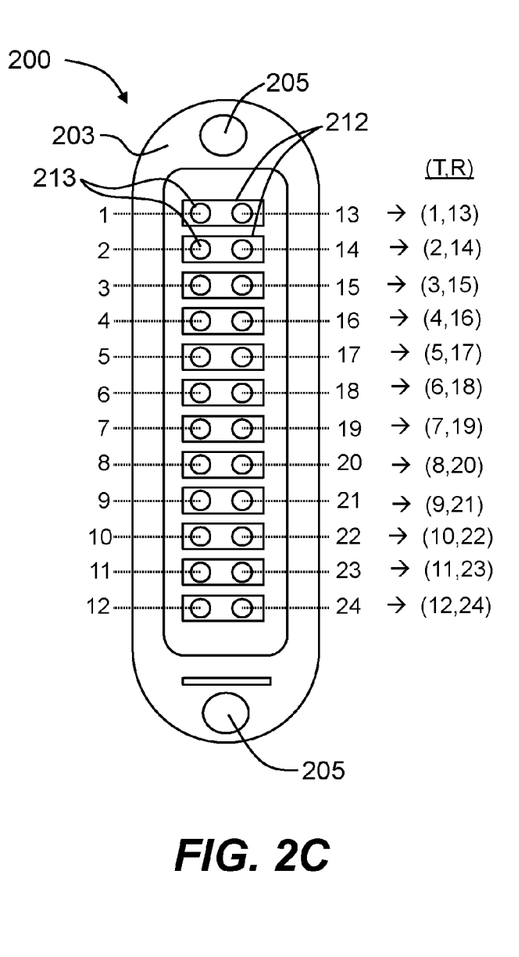
FIG. 2C is a front-end view of the breakout module of FIGS. 2A and 2B, illustrating duplex front-end adapters and an example polarity configuration of the transmit and receive connection locations (T,R) for an example 24-fiber module.

FIG. 2A is a front elevated and partial cut-away view of an example breakout module 200, while FIG. 2B is a close-up side and partial cut-away view and FIG. 2C is a front-end view. Each breakout module 200 includes a casing or housing 201 having at least one wall 201W that in an example defines a front end 202, a back end 204 and an interior 206. Interior 206 houses two optical fiber arrays 208A and 208B made up of connectorized optical fibers 209, i.e., fibers of each array are terminated individually at one end with connectors 210 and collectively at the other end with at least one multifiber connector 211, such as an MPO connector.

The module-based system 100 includes two breakout modules 200L and 200R, with breakout module 200L having two optical fiber arrays 208LA and 208LB and breakout module 200R having two optical fiber arrays 2008RA and 2008RB. Thus, there are a total of four optical fiber arrays in the module-based system 100, and their configuration is explained in greater detail below.

The front end 202 of module 200 includes a face plate 203 used to mount the module into housing 132 using mounting pins 205. The face plate 203 of module 200 supports one or more connector adapters 212 ("front-end adapters") that have pairs of alignment sleeves 213 each sized to accommodate a single fiber connector, e.g. LC or SC connectors. In the case of a 2-fiber MT-RJ® connectors, the two fibers 209 share a single ferrule and the ferrule fits into a single alignment sleeve 213 on the adapter.

Alignment sleeves 213 are also referred to as "ports" and define connection locations. In an example, face plate 203 supports twelve front-end adapters 212 each configured to accommodate a pair of connectors 210 connected to one end of fibers 209, with one fiber at a transmit (T) location and one fiber at a receive (R) location. Front-end adapters 212 extend through face plate 203 and into casing interior 206, as best shown in FIG. 2B. Each front-end adapter 212 is configured to mate on the module-interior side with connectors 210 of fibers 209, and on the outside to connectors 252 of jumpers 250, as described below.

With reference again to FIG. 2A, module 200 also includes one or more connector adapters 214 ("back-end adapters") at back end 204. In the example shown, there are two back-end multifiber adapters 214, e.g., each are 12-fiber adapters. The back-end adapters 214 each includes alignment sleeves or connection locations 215, as shown in FIG. 2B. The back-end adapters are configured to support back-end connector 210. The connection location numbers for the twenty-four connection locations 215 and their transmit (T) and receive (R) designation for module 200 are also shown in table form on the right side of FIG. 2C. The management of the polarity configuration for optical pathway OP based on the connection location numbers or fiber numbers is discussed in greater detail below.

It is noted that the connection locations numbers and their T and R designations can be reversed from what is shown in FIG. 2A and as discussed below and not impact the fundaments polarity management as disclosed herein.

The close-up inset of FIG. 2A shows an end-on view of an example multifiber MPO back-end adapter 214, along with the endface of a multifiber connector 211 that has two rows or planes of connection locations 215, with the connection locations for optical fiber array 208A residing on one plane and the connection locations for optical fiber array 208B residing in the other plane, as indicated in parenthesis in the close-up inset of the back-end adapter. Thus, fibers 209 of the first fiber array 208A are not coplanar with the fibers 209 of the second fiber array 209A when there is a single multifiber connector 211 supported by a single back-end adapter 214.

In an example, each optical fiber array 208A and 208B originates at one or more back-end adapters 214, with one fiber 209 from each optical fiber array forming a fiber pair at one or more front-end adapters 212. Said differently, in an example the two fibers 209 that form a fiber pair originate from different back-end adapters.

In an example configuration, module 200 can have a single back-end adapter 214 configured to receive all of the fibers 222 from trunk cable 200, e.g., in two 12-fiber rows. In another example configuration, module 200 can have first and second back-end adapter 214, with each configured to receive optical fibers 209 for first and second fiber arrays 208A and 208B, respectively. Also, front end 202 of module 200 can support a single front-end adapter 212 that is configured to support multiple duplex connections, as illustrated in FIG. 2A. In an example, front-end and back-end adapters 212 and 214 are configured as MPO adapters. In other embodiments, multiple front-end adapters 212 are employed.

In an example, fiber arrays 208A and 208B are made of different types of fibers 209, e.g., one array includes single mode fibers while the other array includes multimode fibers.

As noted above in connection with FIGS. 1 and 2B, system 100 also includes optical jumper cables or patch cords (hereinafter, "jumpers") 250 (denoted 250L and 250R). Jumpers 250 are connectorized, i.e., they include connectors 252 at each end, with one connector configured to plug into the one or more front-end adapters 212 of module 200, and the other connector configured to plug into the front end 124 of one of the devices 122. Jumpers 250 are typically 2 m to 10 m in length, but can be much longer if necessary. In an example, jumpers 250 are duplex jumpers and connectors 252 are duplex connectors (e.g., LC connectors, SC connectors, RT-MJ connectors, etc.), while front-end adapters 212 are duplex adapters, so that each front-end adapter 212 supports a 2-fiber or duplexed single-fiber connection.

With reference again to FIG. 1, modules 200L and 200R are optically connected by a trunk cable 220 that carries trunk fibers 222. Trunk cable 220 can include a main section 221 and one or more or legs 224 on either end of the main section that each includes two or more fibers 222. In an example, legs 224 are connectorized, i.e., they include connectors 226 that plug into back-end adapters 214 of modules 200L and 200R, thereby establishing optical communication with first and second fiber arrays 208L and 208R therein. Trunk cable 220 can be very long (e.g., hundreds of meters, many kilometers, etc.) and typically spans a section of a large building or a data center. An example connector 226 is an MPO connector, e.g., a 12-fiber MPO connector.

Trunk cable 220 can support a relative large number N of trunk fibers 222 (e.g., multiples of 24, such as 24, 48, 72, 96, etc.). Trunk cable 220 can include one or more ribbonized sections that operably support a portion (e.g., N/2) of the total number N of trunk fibers, e.g., twelve trunk fibers 222 of a total of N=24 trunk fibers. Generally, N is an even number equal to 2 or greater, i.e., the trunk cables 220 considered herein carry N trunk fibers 222, for N=4, 6, 8, . . . .

Trunk optical fibers 222 define first and second trunk optical fiber arrays 228A and 228B, as show in the close-up inset of FIG. 1. Trunk cables 220 that have legs 224 also typically include furcation locations 230 where the individual optical fibers 222 branch off into the different legs 224. A feature of trunk fiber arrays 228A and 228B as employed herein is that trunk cable legs 224 contain fibers 222 that carry signals in only a single direction, i.e., one leg carries optical signals that travel from device 122R to device 122L while the other leg carries optical signals that travel from device 122L to device 122R. In particular, first trunk fiber array 228A carries optical signals in one direction second trunk fiber array 228B carries optical signals in a second direction.

The portion of system 100 that includes trunk fiber arrays 228A and 228B, first and second left-side fiber arrays 208LA and 208LB, and first and second right-side fiber arrays 208RA and 208RB is referred to herein as an "optical pathway system" 102 that defines an optical pathway OP. A total of six fiber arrays are thus used to define this example optical pathway system 102.

Figure 3A:
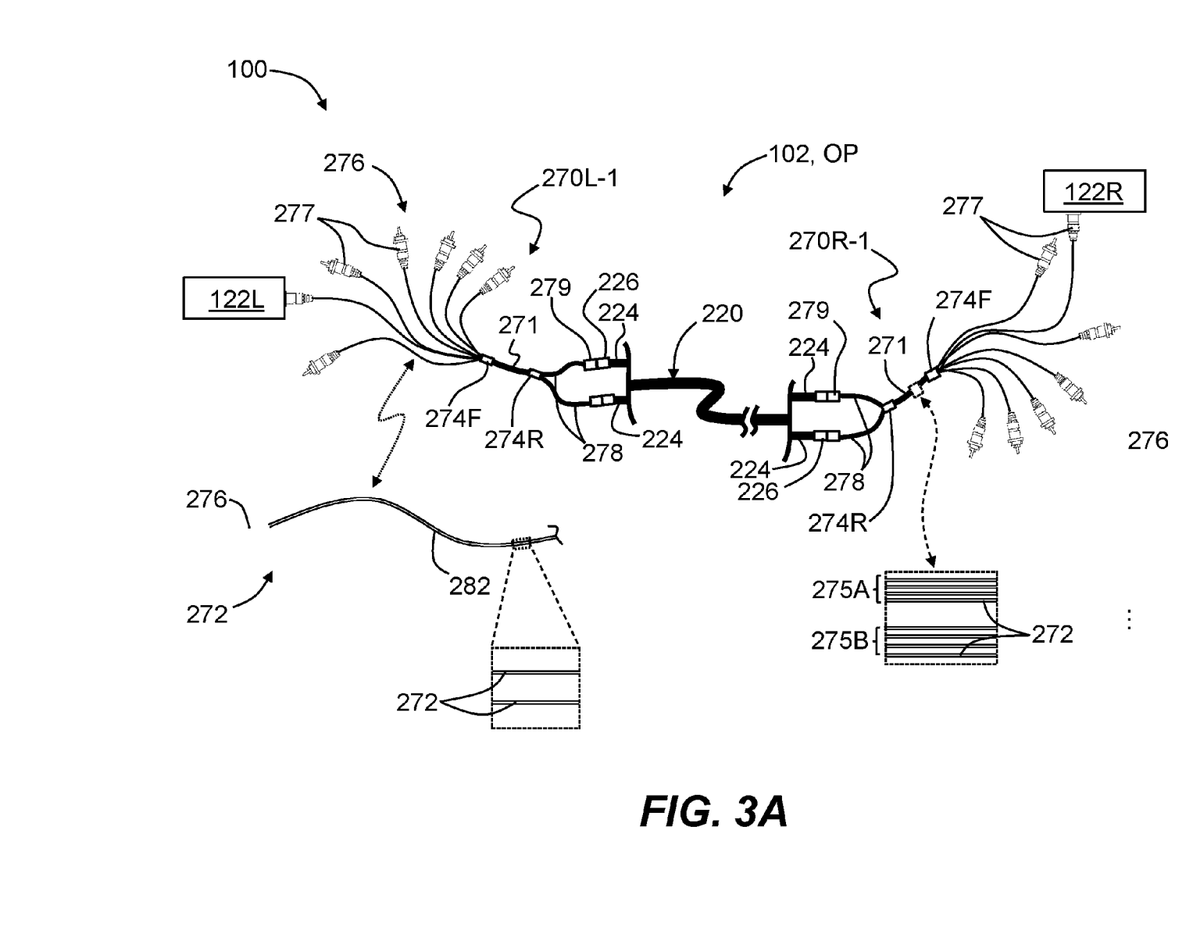
FIG. 3A is a schematic diagram of an example pre-terminated optical fiber cabling system that includes an example of a pre-terminated optical pathway as disclosed herein that utilizes a trunk cable and breakout harnesses.

FIG. 3A is a schematic diagram of an example pre-terminated optical fiber cabling system 100 that includes an example of optical pathway OP as disclosed herein that utilizes trunk cable 220 and left and right breakout harnesses 270, denoted 270L and 270R. The example trunk cable 220 includes two legs 224 at each of its ends. Each trunk leg 224 its terminated by a connector 226.

Figure 3B:
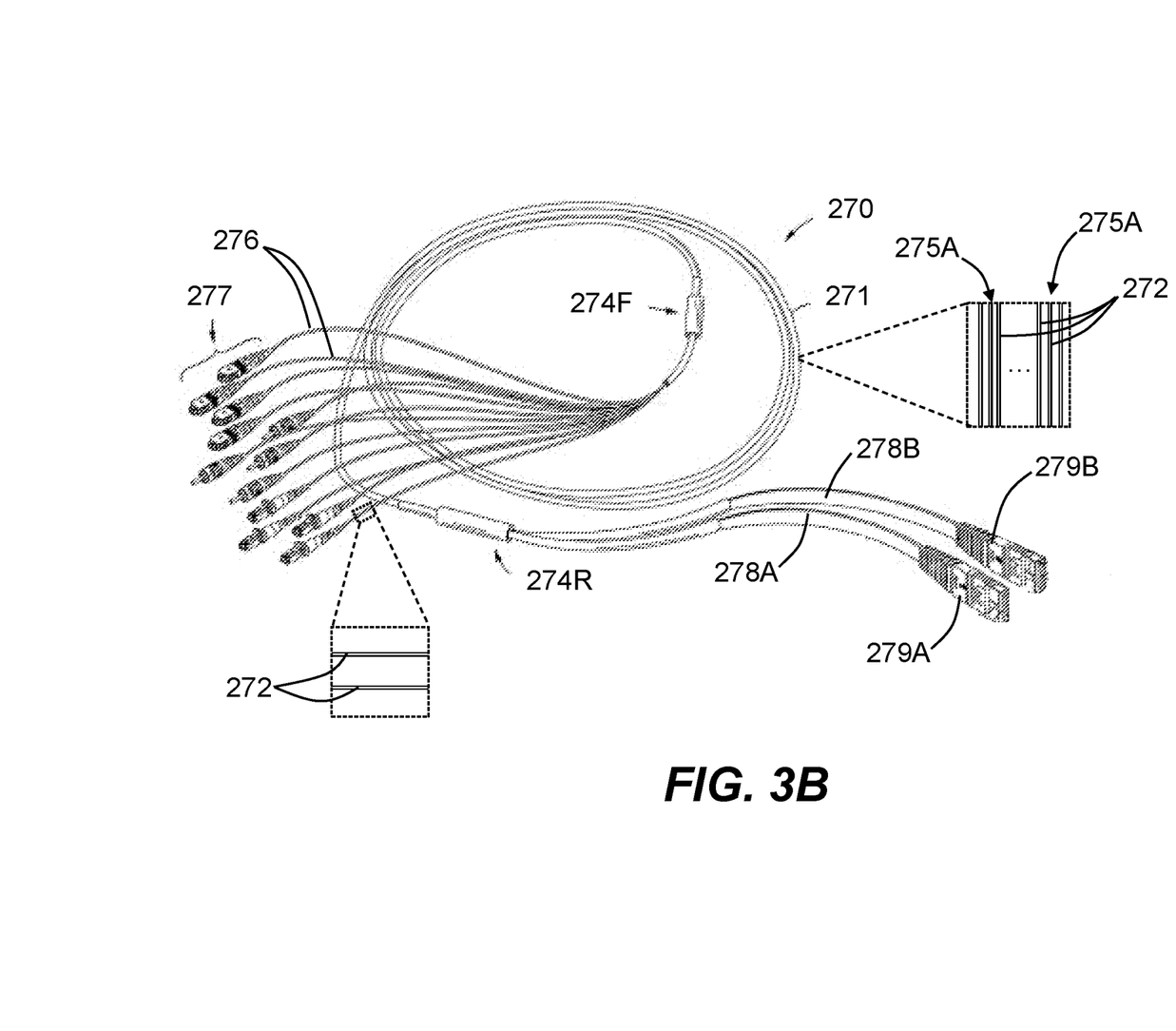
FIG. 3B is a close-up view of an example breakout harness suitable for use in the pre-terminated optical fiber cabling system of FIG. 3A.

FIG. 3B is a close-up view of an example breakout harness 270. Breakout harness 270 supports N optical fibers 272. Breakout harness 270 includes a main section 271 that encases all N fibers 272. Breakout harness 270 includes front and rear furcation locations 274F and 274R that terminate respective ends of main section 271. Front furcation location 274F is where the N fibers 272 branch out into branches 276 that each carries a pair of fibers 272. Branches 276 are terminated by connectors 277. Connectors 277 can be 2-fiber connectors such as MT-RJ® connectors, or duplexed single fiber connectors such as SC or LC connectors that are duplexed together with a duplexing adapter or duplexing clip. Connectors 277 obviate the need for jumpers 250 to connect to devices 212. The N fibers 272 of breakout harness 270 define two fibers arrays 275A and 275B, as shown in the close-up inset view of the main section 271 in FIGS. 3A and 3B.

Rear furcation location 274R is where the N fibers 272 branch out into two legs 278A and 278B that each carrying N/2 fibers 272 that respectively define fiber arrays 275A and 275B. The two legs 278A and 278B are terminated by multifiber connectors 279A and 279B, which are configured to connect to multifiber connectors 226 of legs 224 of trunk cable 220. The two fibers 272 that make up the pairs of fibers for each branch 276 come from different legs 278, i.e., each branch 276 is made up of one fiber from each of legs 278A and 278B.

Thus, the breakout harness embodiment of optical pathway OP is defined by the two trunk fiber arrays 228A and 228B and the two fiber arrays 275A and 275B of each breakout harness 270L and 270R, for a total of six fiber arrays. Breakout module 200 and breakout harness 270 are two different types of a breakout assembly that includes a fiber array, which constitutes part of the optical pathway OP of the optical pathway system 102.

Module-Based Optical Path

Figure 4A:
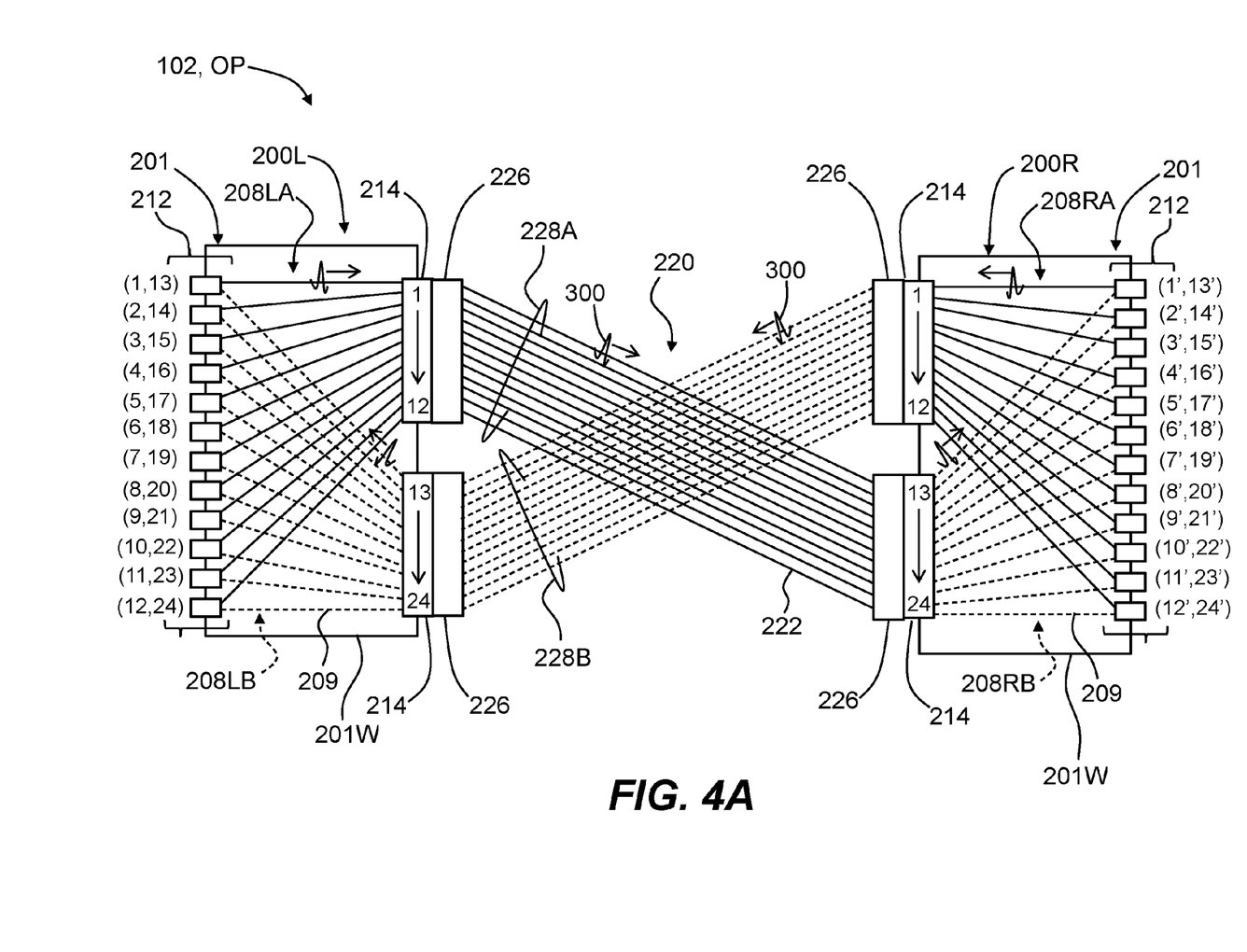
FIG. 4A is a schematic diagram of an example optical pathway according to the disclosure as defined by a trunk cable and two breakout modules.

FIG. 4A is schematic diagram of an example optical pathway system 102 based on the module-based configuration of system 100 of FIG. 1. As discussed above, optical pathway system 102 includes the first and second fiber arrays 208LA and 208LB on the left-hand side, first and second trunk fiber arrays 228A and 228B, and first and second fiber arrays 208RA and 208RB on the right-hand side. Optical signals 300 travel only in one direction each fiber array. One optical signal 300 is shown in system 100 for each direction of travel over the optical pathway OP defined by optical system 102 for ease of illustration.

As noted above, in an example, modules 200L and 200R are identical modules, i.e., they have the same configuration for fiber arrays 208A and 208B and the same configuration for the front-end and back-end adapters 212 and 214. For ease of illustration and explanation, the connection location numbering for module 200R on the right-hand side of the optical path system 102 uses prime notation, i.e., (1', 13'), (2', 14'), etc. Thus, connection locations 1-12 are T connection locations; Connection locations 1'-12' are T' connection locations. Connection locations 13-24 are R connection locations. Connection locations 13'-24' are R' connection locations.

Because fibers 209 define the connection locations T and R, the connection locations numbers for T and R also define the "fiber numbers" for fibers 209 in fiber arrays 208LA and 208LB, respectively. For example, the fibers 209 in fiber array 208LA have fiber numbers T=1 through 12, while the fibers 209 in fiber array 208LB have fiber numbers R=13 through 24. Likewise, the fibers 209 in fiber arrays 208LB and 208RB have fiber numbers T'=1' through 12', and R'=13' through 24', respectively. In the discussion below, the term "connection location" is used for T, R and T' and R' for ease of discussion, but it will be understood that this is synonymous with "fiber number."

The polarity management with respect to the connection locations or fiber numbers T and R on the left-hand side (module 200L) and the connection locations or fiber numbers T' and R' on the right-hand side (module 200R) that define the optical pathway OP can be stated as follows:

Optical pathway section OP1 defined by fiber arrays 208LA, 228A and 208RB connects the transmit connection locations or fiber numbers T={1-12} to respective receive connection locations or fiber numbers R'={13'-24'} (i.e., transmit connection location 1 on the left-side module 200L connects to receive connection location 13' on the right-side module 200R; transmit connection location 2 on the left-side module connects to receive connection location 14' on the right-side module, . . . transmit connection location 12 on the left-side module connects to receive connection location 24' on the right-side module).

optical pathway section OP2 defined by fiber arrays 208LB, 228B and 208RA maps receive connection locations or fiber numbers R={13-24} on the left-side module 200L to transmit connection locations or fiber numbers T'={1'-12'} on the right-side module 200R (i.e., receive connection location 13 on the left-side module 200L connects to transmit connection location 1' on the right-side module 200R; receive connection location 14 on the left-side module connects to transmit connection location 2' on the right-side module, . . . receive connection location 24 on the left-side module connects to transmit connection location 12' on the right-side module).

In shorthand notation, these connection or fiber number mappings for optical path sections OP1 and OP2 of optical path OP can be represented as:

{T}→{R'}={fiber array 208LA}→{fiber array 208RB}={1-12}→{13'-24'}

{R}→{T'}={fiber array 208LB}→{fiber array 208RA}={13-24}→{1'-12'}

Figure 4B:
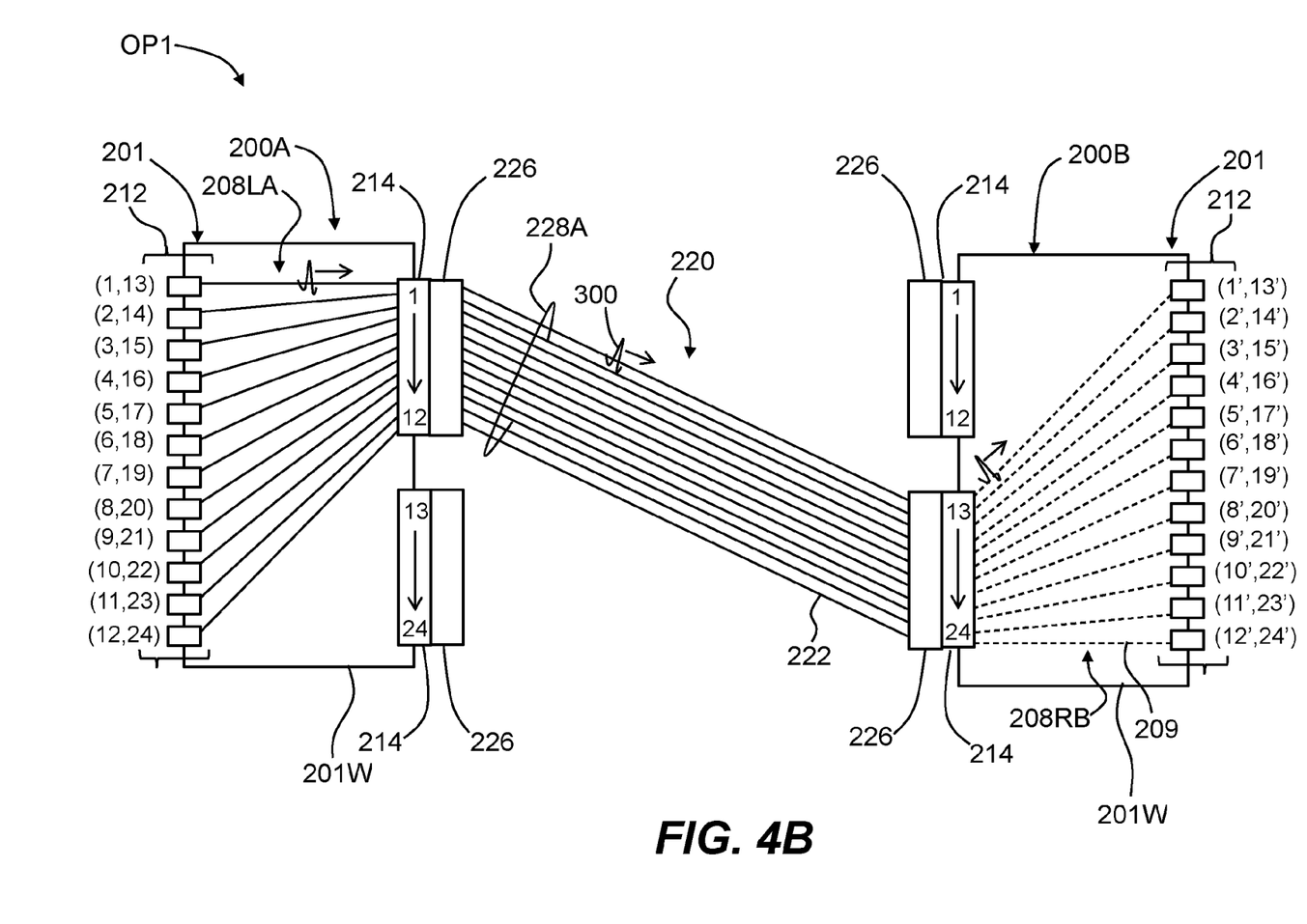
FIGS. 4B and 4C are similar to FIG. 4A, but only showing the first and second optical paths, respectively.
Figure 4C:
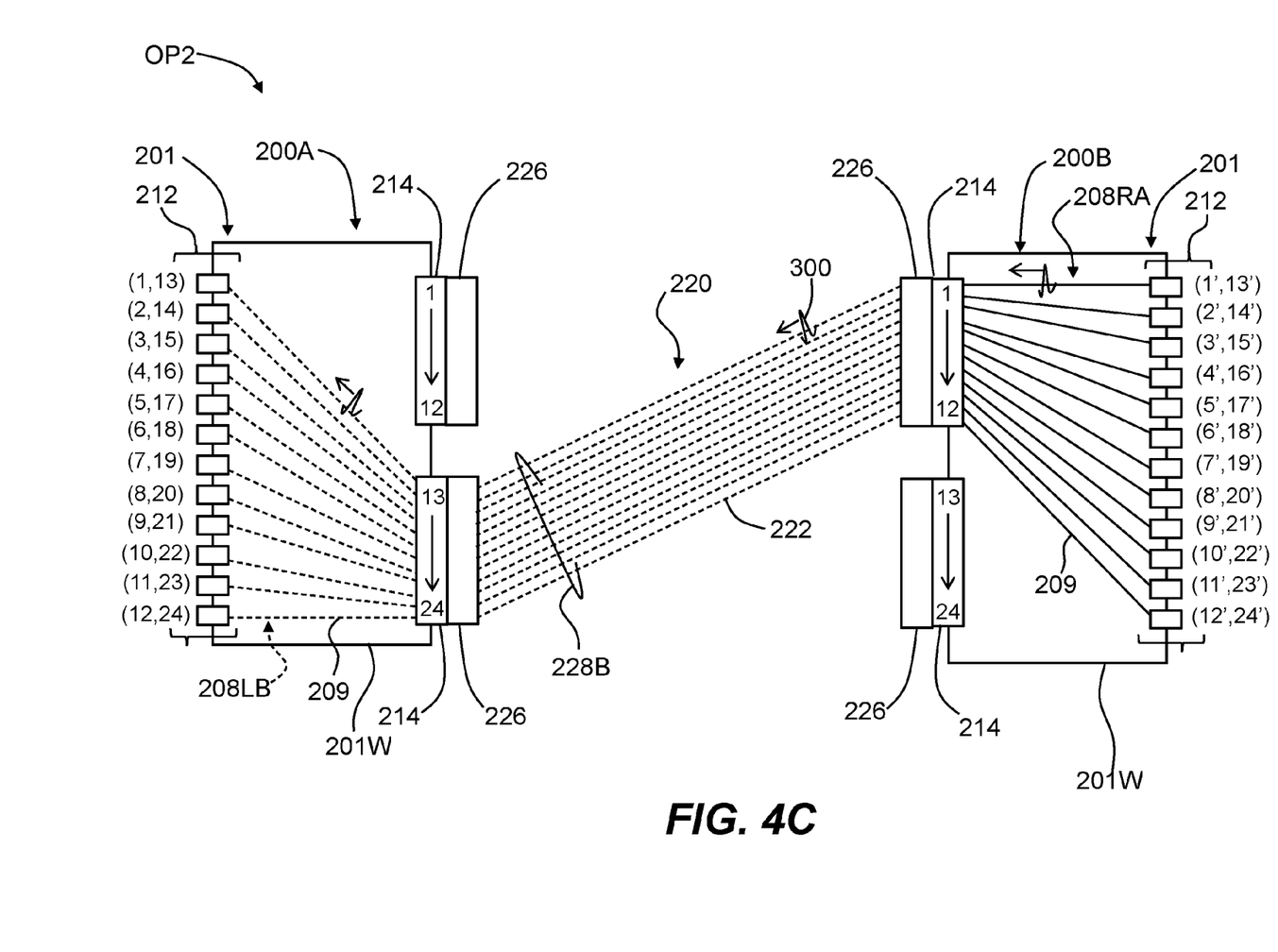

FIG. 4B is similar to FIG. 4A but only shows optical path OP1 and the associated left-to-right transmission of optical signals 300. Likewise, FIG. 4C is similar to FIG. 4A but only showing optical path OP2 and the associated right-to-left transmission of signals 300.

The above-described connection mapping results in pairs of transmit and receive connection locations or fiber numbers {T,R'}={1,13'}, {2,14'}, {3,15'} ... {12,24'} for the first optical path OP1 and pairs of transmit and receive connection locations or fiber numbers {R,T'}={13,1'}, {14, 2'}, {15,3'} ... {24,12'} for the second optical path. Here, the brackets {•} are used to denote left-to-right mapped pairs of connection locations or fiber numbers. Parenthesis (•) are used to denote pairs of fibers at the same connection location, i.e., pairs (T,R) and pairs (T',R').

The connection polarity management defined by {T}→{R'}={1-12}→{13'-24'} and {R}→{T'}={13-24}→{1'-12'} is for an example embodiment of optical pathway OP that involves a total of N=24 fibers. Corresponding polarity managements apply generally to embodiments of optical pathway OP that include N fibers in each fiber array. Accordingly, for a total of N fibers (for N even and greater than 2), the fiber arrays 208LA, 208LB, 208RA and 208RB can be defined as follows:

208LA=T=1 to N/2,
208LB=R=((N/2)+1) to N,
208RA=T'=1' to (N/2)'; and
208RB=R'=((N/2)+1)' to N'.

The connections between fiber arrays 208LA and 208RB and the connections between fiber arrays 208LB and 208RA can be written as follows:

{T}→{R'}={208LA}{208RB}={1 to (N/2)}→{((n/2)+1)' to N'}  Eq. 1A

{R}→{T'}={208LB}→{208RA}={((N/2)+1) to N}→{1' to (N/2)}.  Eq. 1B

The connections or fiber numbers for 1 to N/2 are all one type, i.e., either all transmit T or all receive R. The connections or fiber numbers [(N/2)+1] to N are all of the other type, i.e., receive R or transmit T.

In the examples set forth herein, connections 1 to N/2 are transmit T while connections (N/2)+1 to N are receive R. It is noted that it is the physical locations of the connection locations and the actual interconnections of fiber arrays 208LA, 208LB on the left and 208RA, 208RB on the right side of the optical pathway system 102 and how they are interconnected to one another to define the optical pathway OP that matters, and not the numbering of these locations or the particular numbering scheme for the fibers 209 per se.

Note also that the notation N' is to be read as (N)', which is to say that N' is not another integer but instead represents the primed connector locations or fiber numbers (e.g., 1', 2', ... 24') on the right-hand side of optical pathway OP.

The optical pathway connection between the transmit and receive connection locations or fiber numbers of the first and second fiber arrays 208LA, 208LB, 208RA and 208RB based on Eq. 1 above can be written as:

{T,R'}={1 to (N/2),[((N/2)+1)' to N'}  Eq. 2a

{T,R'}={((N/2)+1) to N,1' to (N/2)'}  Eq. 2b

The pairings (T,R) of transmit and receive connection locations or fiber numbers at the left and right sides of the optical pathway system 102S can be respectively written as:

(T,R), where T=1 to (N/2) and R=((N/2)+1) to N.

(T',R') where T'=1' to (N/2)' and R'=((N/2)+1)' to N'.

Optical Path with Breakout Harnesses

Figure 5A:
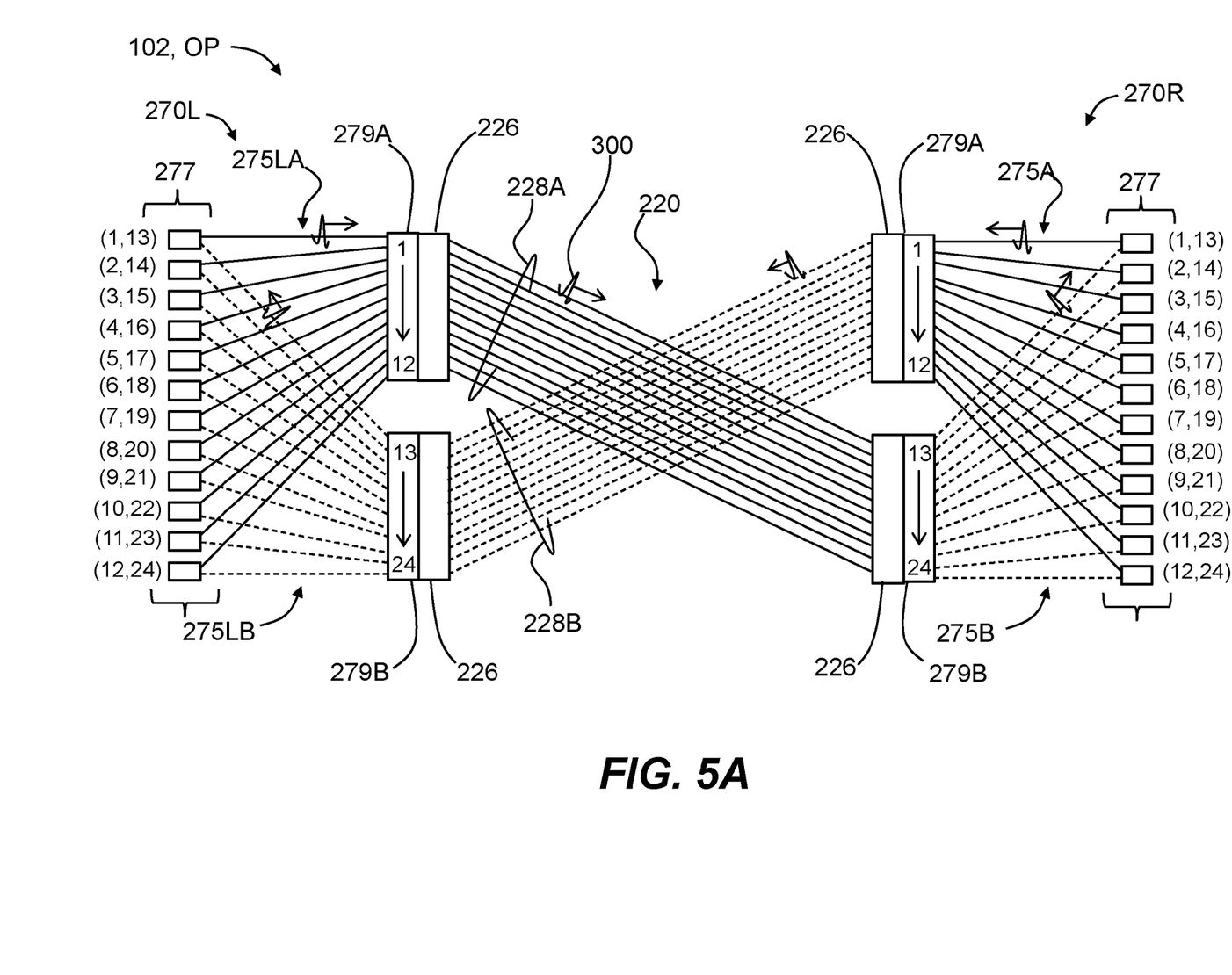
FIG. 5A is similar to FIG. 4A, and illustrates an example of an optical pathway according to the disclosure as defined by a trunk cable and two breakout harnesses.
Figure 5B:
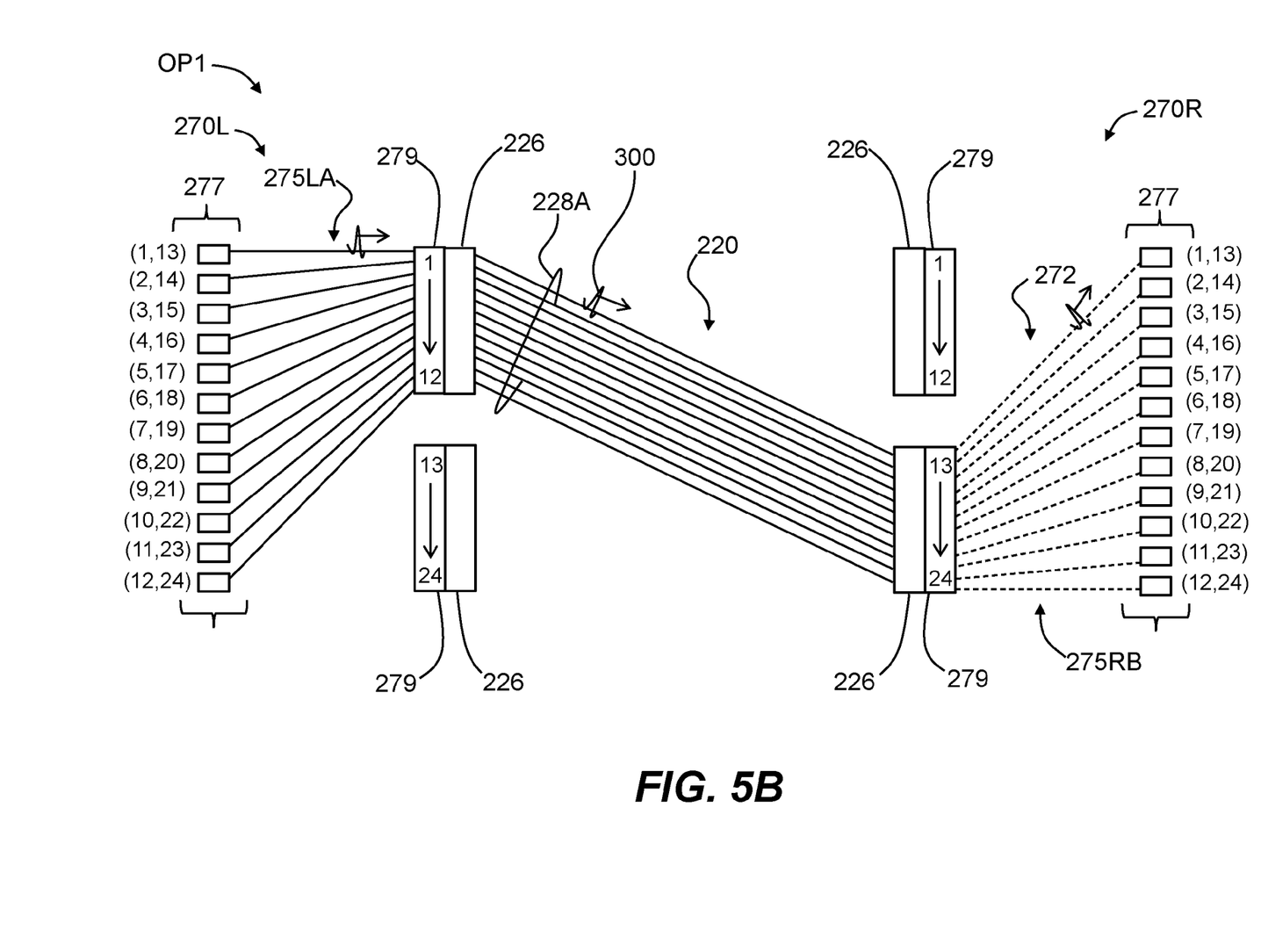
FIGS. 5B and 5C are similar to FIG. 5A, but only showing the first and second optical paths, respectively.
Figure 5C:
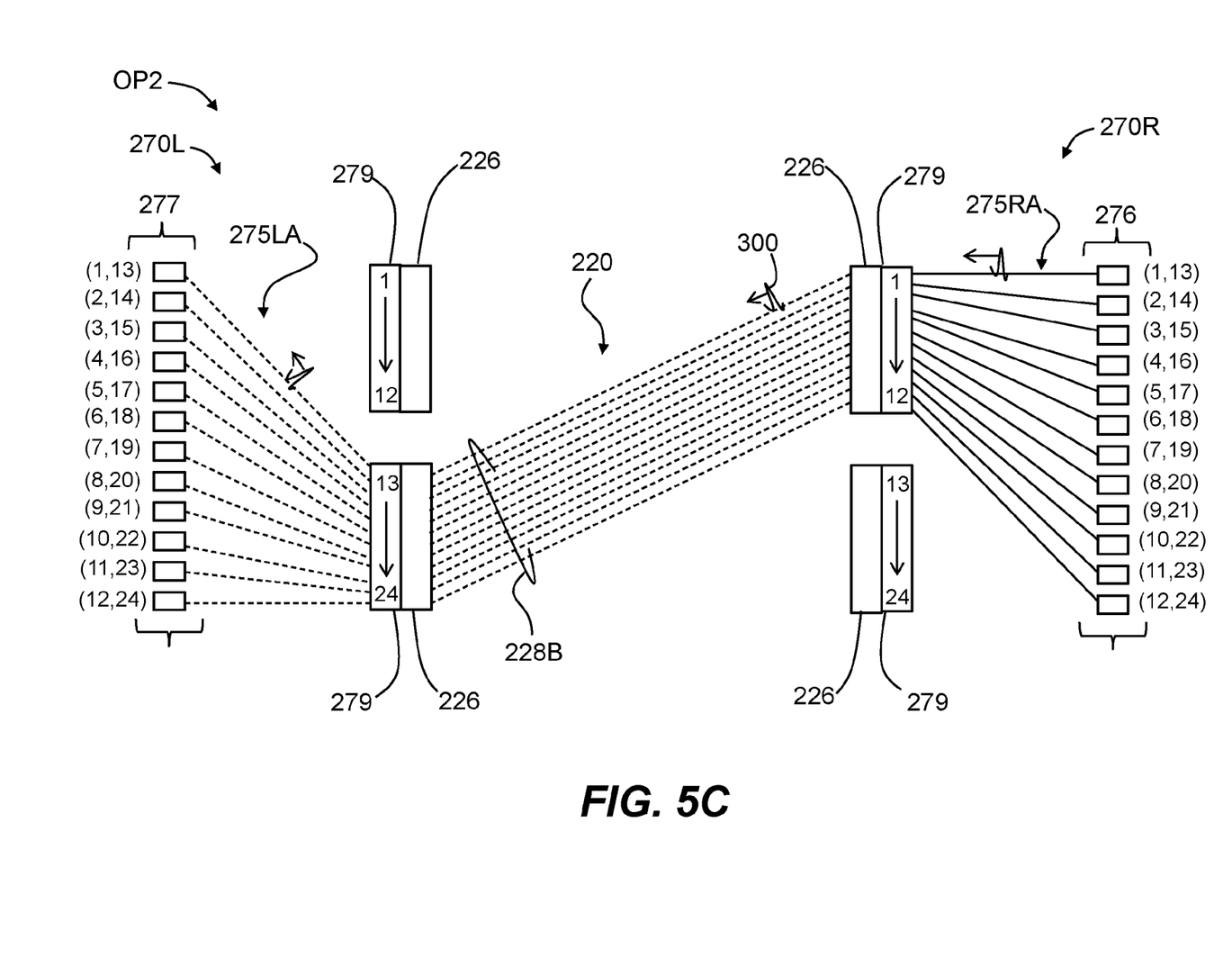

FIGS. 5A through 5C are similar to FIGS. 4A through 4C and illustrate an example optical path OP that utilizes breakout harnesses 270L and 270R rather than breakout modules 200. The two optical paths OP1 and OP2 are shown separately in FIGS. 5B and 5C, respectively. Rather than having front-end and back-end adapters 212 and 214, breakout harnesses 270 have connectors 276 that define the transmit and receive locations and can connect directly to devices 212.

The explanation of the polarity management of the transmit and receive connection locations or fiber numbers T and R for the left side and T' and R' for the right side of the optical path system 102 are the same as discussed above for the module-based embodiment.

It is further disclosed that proper maintenance of system polarity requires that the fiber arrays 228 of the trunk 220 be mated to fiber assemblies 200 or 270 at each end of the trunk in a manner so that each transmit fiber of fiber arrays 208LA and 208RA are placed in optical communication with a receive fiber of fiber arrays 208LB and 208RB and that the fiber paths so formed should be paired at each end. As an example, for a 24-fiber trunk 220 having two legs 224 on each end, each leg terminated with a 12-fiber MPO connector and subsequently mated on each end to a fiber assembly embodying the schematic diagram of FIG. 4A and where the assemblies 200 or 270 comprise 12-fiber MPO style connectors, the desired polarity can be achieved by orienting and terminating the fibers of each trunk leg 224 on one end of trunk 220 into the MPO connectors in a forward fiber order from 1 to 12 and orienting and terminating the fibers of each trunk leg 224 on the other end of the trunk 220 into the MPO connectors in a reverse fiber order from 12 to 1.

It will be apparent to those skilled in the art that various modifications to the preferred embodiments of the disclosure as described herein can be made without departing from the spirit or scope of the disclosure as defined in the appended claims. For example, implementations involving modules could rather take the form of optical harness implementations and implementations involving optical harnesses could rather take the form of optical module implementations. Thus, the disclosure covers the modifications and variations provided they come within the scope of the appended claims and the equivalents thereto.

What is claimed is:

1. An optical assembly for providing N optical connections for N/2 pairs of fibers, for N even and greater than 2, comprising:
a first fiber array of fibers T=1 to N/2 terminated at one end by at least one multifiber connector and terminated at the other end by either first single-fiber or first 2-fiber connectors;
a second fiber array of fibers R=[(N/2)+1] to N terminated at one end by the at least one multifiber connector and terminated at the other end by either second single-fiber or second 2-fiber connectors; and wherein the fibers T and R are paired to form at least one (T,R) fiber pair, and at least one of the fibers T of the first fiber array is differentiated from at least one of fiber R of the second fiber array by at least one characteristic, wherein the at least one characteristic is at least one of bandwidth-distance product, skew, differential modal delay, attenuation performance, bend sensitivity, modal dispersion, chromatic dispersion, polarization mode dispersion, cutoff wavelength, or transmission modes supported under given operating conditions.

2. The optical assembly according to claim 1 wherein the at least one characteristic is refractive index profile, core size, mode field diameter, cladding diameter, composition, or length.

3. The optical assembly according to claim 1 wherein the at least one characteristic is length.

4. The optical assembly according to claim 1, wherein the at least one multifiber connector consists of a single multifiber connector, and wherein:

the fibers T of the first fiber array and the fibers R of the second fiber array are terminated at one end into the single multifiber connector; and the fibers of the first fiber array are not coplanar with the fibers of the second fiber array.

5. The optical assembly according to claim 1, wherein the at least one multifiber connector consists of a single multifiber connector, and wherein the fibers T of the first fiber array and the fibers R of the second fiber array are disposed in the single multifiber connector in respective first and second planes.

6. The optical assembly according to claim 1, wherein the fibers T and fibers R are terminated with single-fiber connectors and are duplexed into pairs using the single-fiber connectors to form the at least one (T,R) fiber pairs.

7. The optical assembly according to claim 1, wherein the fibers T and fibers R are terminated in pairs into 2-fiber connectors to form the at least one (T,R) fiber pairs.

* * * * *